United States Patent [19]

Sato et al.

[11] Patent Number: 4,918,143

[45] Date of Patent: Apr. 17, 1990

[54] POLYPHENYLENE ETHER RESIN COMPOSITION

[75] Inventors: Hisatake Sato; Masaharu Makino, both of Yokohama, Japan

[73] Assignee: Nippon Petrochemicals Co., Ltd., Japan

[21] Appl. No.: 357,050

[22] Filed: May 25, 1989

[30] Foreign Application Priority Data

May 26, 1988 [JP] Japan .................. 63-128773

[51] Int. Cl.⁴ ............................. C08L 71/04
[52] U.S. Cl. ........................ 525/132; 525/915; 525/905; 526/290
[58] Field of Search ............. 525/132, 915, 905

[56] References Cited

U.S. PATENT DOCUMENTS 4,189,411 2/1980 Haaf ..................... 525/132

Primary Examiner—Jacob Ziegler
Attorney, Agent, or Firm—Ostrolenk, Faber, Gerb & Soffen

[57] ABSTRACT

A polyphenylene ether resin composition comprising as the major components:
(a) 100 parts by weight of polyphenylene ether resin, and
(b) 1-30 parts by weight of hydrocarbon resin which has a softening point of 140°-180° C. and a ratio of weight-average molecular weight to number-average molecular weight $M_w/M_n$ of 2.0 or less, and is prepared by polymerizing a raw material oil of hydrocarbon in which a total content of indene and methylidene is 80% by weight or more by the use of a Friedel-Crafts type catalyst.

9 Claims, No Drawings

POLYPHENYLENE ETHER RESIN COMPOSITION

BACKGROUND OF THE INVENTION (1) Field of the Invention

The present invention relates to a polyphenylene ether resin composition obtained by incorporating a resin which is prepared from a specified hydrocarbon mixture into the polyphenylene ether resin, and the moldability of the resulting polyphenylene ether resin composition is improved without damaging high rigidity and thermal properties which belong inherently to polyphenylene ether resin.

(2) Description of the Prior Art

Polyphenylene ether resin is known as a thermoplastic resin being excellent in mechanical, electrical and heat-resisting properties, and which is utilized in the wide variety of fields of automobiles, office automation equipment, electrical-electronic parts and the like. On the other hand, it has been known that polyphenylene ether resin has poor flowability, so that the moldability and workability thereof are also poor, and besides there is a problem in its heat stability. In order to make the practical moldability and workability of polyphenylene ether resin easy, it has been proposed to incorporate high-impact polystyrene into the polyphenylene ether resin (U.S. Pat. No. 3,338,435) and the industrial practice thereof has been publicly known. However, sufficient effects for improving the flowability could have not yet been attained by the proposal described above.

Furthermore, it has been known a composition prepared by allowing an aromatic hydrocarbon resin obtained by polymerizing unsaturated hydrocarbons in cracked naphtha produced by cracking petroleum, particularly mixed vinyltoluene or mixed vinylxylene to be contained in polyphenylene ether resin, and another composition prepared by allowing cumarone-indene resin produced from coal tar naphtha to be contained in polyphenylene ether resin (Patent Publication No. 13584/1982 and Patent Laid-open No. 3136/1972 Official Gazettes). In these polyphenylene ether resin compositions, while effects for the improvement in flowability thereof may be observed, the incorporation of the above resins results in deterioration of thermal resistance and impact resistance in the resulting resin compositions.

DETAILED DESCRIPTION OF THE INVENTION

In order to improve the problems as described above, the present invention provides a composition, the flowability of which is improved in case of molding while maintaining various physical properties involved in polyphenylene ether resin.

In the meantime, when an inorganic filler such as glass fiber and the like is added to polyphenylene ether resin resin, elastic coefficient and dimensional stability of the molded articles are elevated. In case of adding such inorganic filler, however, the flowability of the polyphenylene ether resin composition becomes worse at the time of molding, so that it has been heretofore impossible to incorporate such inorganic filler into polyphenylene ether resin at a high content, for example, at a ratio of 50-100 parts by weight of an inorganic filler with respect to 100 parts by weight of polyphenylene ether resin. However, the present invention is particularly preferable for preparing a resin composition into which an inorganic filler is incorporated at such a high content as described above.

Polyphenylene ether used in the composition according to the present invention is a polymer having the following general formula:

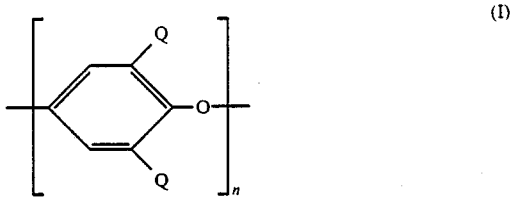

wherein a unit ether type oxygen atom is connected to the adjacent next unit benzene nucleus, n is an integer of at least 50, and each Q is a monovalent substituent selected from the group consisting of hydrogen, halogen, hydrocarbon containing no tertiary α-carbon atom, hydrocarbonoxy group, and halohydrocarbonoxy group containing at least two carbon atoms between halogen atom and phenyl group.

Optimum polyphenylene ethers for the object of the present invention are those having alkyl substituents at the two ortho-positions with respect to the ether type oxygen atom, i.e. ones having the above general formula wherein Q is alkyl groups, and particularly preferable is methyl groups, respectively, and the typical example of which is poly(2, 6-dimethyl-1, 4-phenylene) ether. This polymer has preferably an intrinsic viscosity of about 0.5 when measured in chloroform at 25° C. Further, copolymers which are the ones wherein styrene compounds are grafted to these phenylene ethers as described above may also be used for the present invention. The styrene compound graft polyphenylene ethers used herein mean copolymers and the like obtained by graft-polymerizing styrene compounds, for example, styrene, α-methylstyrene, vinyltoluene, chlorostyrene or the like to the above described polyphenylene ethers.

The problem involved in prior polyphenylene ether resin compositions as described above are solved by incorporating the specified hydrocarbon resin according to the present invention into the former compositions.

More specifically, the present invention is characterized by incorporating the resin of the invention having a softening point of 140°–180° C. as well as a ratio of weight-average molecular weight is number-average molecular weight $M_w/M_n$ of 2.0 or less into polyphenylene ether resin, and the former resin being prepared by polymerizing a hydrocarbon in which the total content of indene and methylindene is adjusted to the 80% By weight or more as a raw material with the use of a Friedel-Crafts type catalyst.

Molecular-weight distribution of said resin is measured by gel permeation chromatography (GPC) calibrated by employing polystyrene as its standard.

In the present invention, it is a characteristic feature to use a resin having a total content of indene and methylindene of 80% by weight or more. In this connection, while high-purity indene and/or methylindene may be used, it is effective to obtain a product which is produced by, for example, distilling hydrocarbons containing comparatively a large amount of indene and/or methylindene, because high-purity indene and/or methylindene are hardly available industrially. More specifically, effectively used are such products each having a total content of indene and methylindene of 80% by weight or more which are prepared by distilling further tar derived from coke oven and the like which is obtained by dry-distilling coal or heavy hydrocarbon mixtures, particularly materials each having a boiling point ranging from 140°-240° C. which are obtained by means of fractional distillation and the like.

Moreover, such products prepared by distilling further fractions having a boiling point of 140°-240° C. which are obtained in case of thermally cracking/-steam-cracking petroleum to attain a total content of indene and methylindene of 80% or more may be also used.

While the products obtained by these distillation processes contain hydrocarbons, oxygen-containing compounds and the like other than indene and methylindene, such products may also be used in the present invention as long as the total content of indene and methylindene is 80% by weight or more in said products.

The total content (R) of indene and methylindene referred to in the present invention is represented by the following formula:

$$R = \text{total content (wt\%) of indene and methylindene} / \text{amount of polymerizable components (wt\%)} \times 100$$

wherein the polymerizable components mean compounds containing carbon/carbon double bond exhibiting polymerizability by the use of a Friedel-Crafts type catalyst and the amount of which corresponds to a total amount of styrene, alkylstyrene, cumarone, dicyclopentadiene and the like in addition to indene and methylindene (weight % of these compounds in the raw material), and on the other hand, the total content of indene and methylindene corresponds to a total amount (weight %) of the indene and the methylindene contained in the raw material.

In the case where such a raw material containing a total content of less than 80% by weight of indene and methylindene is used, the softening point of the resulting resin becomes low in order to make the ratio of $M_w/M_n$ to be less than 2.0 besides, when incorporated to polyphenylene ether, the heat resistance of the resulting product decreases remarkably so that it is not desirable. Such total content is preferably 85% by weight or more in the present invention.

According to the present invention, the above-mentioned raw materials are polymerized by utilizing a Friedel-Crafts type catalyst. As the Friedel-Crafts type catalysts, boron trifluoride, aluminum chloride, complexes of boron trifluoride such as complex of boron trifluoride phenol, complex of boron trifluoride dialkyl ether and the like are used, the amount added thereof is usually 0.05-5% by weight, and preferably 0.1-3% by weight, a period of time for the polymerization is usually from about 10 minutes to about 5 hours, and a temperature in the polymerization is within a range of +10° C.~ +90° C.

After the polymerization, the catalyst is decomposed and removed by the use of an alkali such as caustic soda, sodium carbonate or the like, and then unreacted materials and low polymers are separated by an operation of evaporation, distillation or the like, whereby the hydrocarbon resin according to the present invention is obtained.

The hydrocarbon resin according to the present invention has a softening point of 140°-180° C. and a ratio of weight-average molecular weight to number-average molecular weight $M_w/M_n$ of 2.0 or less, and preferably 1.9 or less.

When the resin having a low softening point is used, the decrease in heat resistance of the resulting composition becomes remarkable when such resin is incorporated into polyphenylene ether, whilst when the resin has too high a softening point, the advantages for improving flowability of the composition are scarcely observed. Furthermore, a high ratio of $M_w/M_n$ results in less advantage for improving flowability of the composition.

While either the polymerizing temperature may be set at a high temperature or a large amount of a solvent for the polymerization may be used in order to attain 2.0 or less of $M_w/M_n$ ratio in the present invention, these procedures are not so desirable. A preferred method is to use around 0.01-5% by weight of a molecular weight modifier such as phenols, ethers, esters, alcohols or the like with respect to the raw material hydrocarbon. Particularly preferable is to use 0.5-5% by weight of phenols such as phenol, cresol, and xylenol with respect to the raw material hydrocarbon.

Although no solvent for polymerization may be employed, toluene, xylenes, ethylbenzene, trimethylbenzene or the mixture thereof may be employed in case of use.

In the resin composition according to the present invention, the object thereof may be attained by suitably incorporating 1-30 parts by weight, preferably 5-25 parts by weight of a hydrocarbon resin into 100 parts by weight of said polyphenylene ether.

There are such disadvantages that improvement in flowability of the resulting composition is insufficient when a small amount of the hydrocarbon resin is added, and that heat distortion temperature drops excessively in case of adding a large amount of the hydrocarbon resin.

To the composition according to the present invention may suitably be added optionally pigment, plasticizer, ultraviolet light absorber, antioxidant, fire retardant, and the other additives.

A method for admixing an aromatic hydrocarbon resin with polyphenylene ether is not particularly limitative, but any method is applicable. For example, the polyphenylene ether and the hydrocarbon resin are dissolved in a solvent such as toluene, a precipitant such as isopropyl alcohol is then added to the resulting solution to coprecipitate the mixture, and thereafter the resulting product may be dried in accordance with a suitable manner. In general, preferable is a method of physically admixing a hydrocarbon resin with polyphenylene ether by the use of a mechanically mixing device which is usually employed for mixing rubber or plastics such as injection molding machine, Banbury mixer, kneader, heating rollers and the like.

[EXAMPLES]

The present invention will be described hereinbelow in more detail in conjunction with examples, but it is to be understood that this invention is not limited to only these examples.

Example 1 for Preparing Resin

Tar gas oil derived from coal tar was distilled to obtain a fraction having a boiling point ranging 170°–205° C. This fraction contained a total amount of 58.4% by weight of indene and methylindene, and 10.8% by weight of the other polymerizable components.

Two mixed materials were prepared by adding 2.0 and 4.5 parts by weight of commercially available cresylic acid (a mixture of 30% by weight of phenol, 10% by weight of o-cresol, 25% by weight of m-cresol, 15% by weight of p-cresol and 10% by weight of xylenol) respectively to 100 parts by weight of said fraction which contain 84.4% by weight of total content of indene and methylindene. These mixed materials were polymerized at 60° C. for 2 hours after adding 0.8 part by weight of boron trifluoride phenol complex compound as the catalyst, the catalyst was then decomposed by means of aqueous caustic soda, the resulting polymers were rinsed and then vacuum-distilled to remove unreacted oils and low polymers, thereby obtaining resins (I) and (II), respectively. The yields of the resins (I) and (II) were 63.1% and 63.8%, respectively.

Comparative Example 1 for Preparing Resin 0.5 part by weight of boron trifluoride diethyl ether complex compound was added to 100 parts by weight of the same fraction as that used in Example 1 for preparing resin, the resulting mixture was polymerized at 60° C. for 2 hours, and thereafter the polymer was subjected to the same after-treatment as that of Example 1 for preparing resin to obtain resin (III). The yield of resin (III) was 61.2%.

Comparative Example 2 for Preparing Resin

A fraction having a boiling point of 145°–210° C. among cracked petroleum fractions obtained by steam cracking of naphtha contained 43.8% by weight of polymerizable components as well as total 15.6% by weight of indene and methylindene. To 100 parts by weight of said fraction containing 35.6% by weight of total content of indene and methylindene was added 0.6 part by weight of boron trifluoride diethyl ether complex compound, the resulting mixture was polymerized at 30° C. for 3 hours, and thereafter the polymer was subjected to the same after-treatment as that of Example 1 for preparing resin to obtain resin (IV) in yield of 36.2%.

Comparative Example 3 for Preparing Resin 1.5 parts by weight of phenol was added to 100 parts by weight of the cracked petroleum fraction used in Comparative example 2 for preparing resin to obtain a mixed material. To the mixed material was added 0.6 part by weight of boron trifluoride phenol complex compound as the catalyst, the resulting mixture was polymerized at 40° C. for 3 hours, and thereafter the polymer was treated by the same manner as that of Example 1 for preparing resin to obtain resin (V) in yield of 36.8%.

Comparative Example 4 for Preparing Resin

A tar gas oil obtained from coal tar contained total 30.3% by weight of indene and methylindene as well as 15.3% by weight of the other unsaturated components. To 100 parts by weight of the fraction of said tar gas oil containing 66.4% by weight of total content of indene and methylindene was added 0.6 part by weight of boron trifluoride phenol complex compound, the resulting mixture was polymerized at 40° C. for 3 hours, and thereafter the polymer was treated by the same manner as that of Example 1 for preparing resin to obtain resin (VI) in yield of 43.2%.

The properties of the resins obtained in Example 1 for preparing resin and Comparative examples 1–4 for preparing resins are shown in Table 1.

TABLE 1

| | Properties of Resins | | | | | |
|---|---|---|---|---|---|---|
| | Example 1 for Preparing Resin | | Comparative Example 1 for Preparing Resin | Comparative Example 2 for Preparing Resin | Comparative Example 3 for Preparing Resin | Comparative Example 4 for Preparing Resin |
| Resin No. | I | II | III | IV | V | VI |
| Softening Point of Resin (°C.) | 172 | 148 | 195 | 153 | 122 | 168 |
| Mn | 1020 | 760 | 1280 | 1230 | 810 | 1180 |
| Mw/Mn | 1.7 | 1.6 | 2.3 | 2.2 | 1.8 | 2.3 |

Example 1

100 parts by weight of poly(2, 6-dimethyl-1, 4-phenylene) ether having intrinsic viscosity of 0.52 dl/g in chloroform solution at 25° C., 10 parts by weight of commercially available high-impact polystyrene "Diarex HT" (trade name, manufactured by Mitsubishi Monsanto Chemical Industry Co., Ltd.), and 10 pars by weight of each of the resins indicated in Table 1 were admixed by the use of a Henschel mixer, and the resulting admixture was then extruded by means of a twin-screw extruder to obtain pellets. These pellets were injected by an injection molding machine to prepare test pieces. The results of physical properties of the test pieces measured are shown in Table 2 and at the same time, the results in case of no addition of the resins of Table 1 are also shown therein.

[TEST METHOD]

1) Melt Index (MI): measured at 260° C., with 10 Kg load.
2) Tensile strength and elongation: effected by using No. 5 dumbbell in accordance with ASTM-D-638.
3) Notched Izod impact strength: effected by using a test piece having ¼ inch thickness in accordance with ASTM-D-256.
4) Heat distortion temperature: effected under pressure of 18.6 Kg/cm$^2$ in accordance with ASTM-D-648.

It is understood from the results of Table 2 that the compositions each containing a specified resin according to the present invention maintain satisfactorily high heat distortion temperatures and improve remarkably melt flowability of each composition.

Example 2 for Preparing Resin 6 parts of phenol was added to 45 parts by weight of indene monomer, 5 parts by weight of styrene monomer, and 50 parts by weight of commercially available xylene (i.e. 90.0% by weight of total content of indene and methylindene) to obtain a raw material oil. To the raw material oil was added 0.5 part by weight of boron trifloride phenol complex compound as the catalyst, the resulting mixture was polymerized at 60° C. for 2 hours, and thereafter the polymer was treated by the same manner as that of Example 1 for preparing resin to obtain a resin having 163° C. softening point, 570 $M_n$, and $M_w/M_n = 1.45$ in yield of 43.2%.

TABLE 2

| Resin No. | Example I | Example II | Comparative Example III | Comparative Example IV | Comparative Example V | Comparative Example VI | — |
|---|---|---|---|---|---|---|---|
| Amount of Resin Added (part by weight) | 10 | 10 | 10 | 10 | 10 | 10 | 0 |
| MI (g/10 min.) | 14.2 | 16.3 | 9.6 | 12.8 | 15.6 | 10.9 | 8.3 |
| Tensile Strength (Kg/cm²) | 540 | 545 | 545 | 520 | 525 | 540 | 520 |
| Elongation at Breakage (%) | 33 | 34 | 33 | 34 | 35 | 35 | 34 |
| Izod Impact Strength (Kg · cm/cm) | 10.6 | 10.8 | 10.8 | 10.5 | 10.2 | 10.5 | 12.7 |
| Heat Distortion Temperature (°C.) | 121 | 120.5 | 121.5 | 119.0 | 117.5 | 120.5 | 122 |

Example 2

Test was effected by varying the amount of the resin prepared in accordance with Example 2 for preparing resin which is to be added to a mixture of 100 parts by weight of poly(2, 6-dimethyl-1, 4-phenylene ether), 15 parts by weight of highimpact polystyrene, and 50 parts by weight of glass fiber "Chopped Glass OS-471S" (trade name, manufacture by Nittobo Co. Ltd.). The results of the test are shown in Table 3.

TABLE 3

| | Comparative Example | Example | Example | Example | Comparative Example |
|---|---|---|---|---|---|
| Amount of Resin added (part by weight) | 0.5 | 7 | 15 | 25 | 40 |
| MI (g/10 min.) | 6.3 | 10.1 | 11.5 | 12.3 | 14.1 |
| Heat Distortion Temperature(°C.) | 130.5 | 128.5 | 127 | 126 | 115 |

When the amount of resin added is within the range limited by the present invention, such composition exhibits a small decrease in the heat distortion temperature and has the excellent flowability. However, melt flowability is poor in case of adding too small an amount of a resin, whilst flowability thereof is good, but the decrease in the heat distortion temperature becomes large in case of adding too large an amount of such resin so that it is undesirable from practical point of view.

We claim:

1. A polyphenylene ether resin composition comprising as the major components:
   (a) 100 parts by weight of polyphenylene ether resin, and
   (b) 1–30 parts by weight of a hydrocarbon resin which has a softening point of 140°–180° C. and a ratio of weight-average molecular weight to number-average molecular weight $M_w/M_n$ of 2.0 or less, and is prepared by polymerizing a raw material oil of hydrocarbon in which the total content of indene and methylindene is 80% by weight or more by the use of a Friedel-Crafts type catalyst.

2. A composition as claimed in claim 1 wherein said hydrocarbon in which a total content of indene and methylindene is 80% by weight or more is prepared from a fraction having a boiling point ranging from 140 to 240° C. among fractions obtained by tar distillation.

3. A composition as claimed in claim 1 wherein said Friedel-Crafts type catalyst is boron trifluorides or the complexes thereof.

4. A composition as claimed in claim 2 wherein said Friedel-Crafts type catalyst is boron trifluorides or the complexes thereof.

5. A composition as claimed in claim 1 containing 5 to 25 parts of said hydrocarbon resin.

6. A composition as claimed in claim 5 wherein said raw material oil has a total content of indene and methylindene of 85% by weight or more.

7. A composition as claimed in claim 6 in which said ratio $M_w/M_n$ is 1.9 or less.

8. A composition as claimed in claim 1 in which said ratio $M_w/M_n$ is 1.9 or less.

9. A composition as claimed in claim 1 wherein said raw material oil has a total content of indene and methylindene of 85% by weight or more.

* * * * *